(12) United States Patent
Feng et al.

(10) Patent No.: US 12,583,165 B2
(45) Date of Patent: Mar. 24, 2026

(54) TRIBOELECTRIC FIBERS, GENERATORS, AND SENSORS

(71) Applicant: VIRGINIA TECH INTELLECTUAL PROPERTIES, INC., Blacksburg, VA (US)

(72) Inventors: Ziang Feng, Blacksburg, VA (US); Shuo Yang, Blacksburg, VA (US); Anbo Wang, Blacksburg, VA (US); Xiaoting Jia, Blacksburg, VA (US); Lei Zuo, Blacksburg, VA (US); Li Yu, Woodbury, MN (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 786 days.

(21) Appl. No.: 17/626,364

(22) PCT Filed: Jul. 24, 2020

(86) PCT No.: PCT/US2020/043418
§ 371 (c)(1),
(2) Date: Jan. 11, 2022

(87) PCT Pub. No.: WO2021/016524
PCT Pub. Date: Jan. 28, 2021

(65) Prior Publication Data
US 2022/0255464 A1 Aug. 11, 2022

Related U.S. Application Data

(60) Provisional application No. 62/878,450, filed on Jul. 25, 2019.

(51) Int. Cl.
B29C 48/14 (2019.01)
B29C 48/00 (2019.01)
(Continued)

(52) U.S. Cl.
CPC .......... B29C 48/142 (2019.02); B29C 48/022 (2019.02); B29C 48/05 (2019.02); (Continued)

(58) Field of Classification Search
CPC ....................................................... D01D 5/34
See application file for complete search history.

(56) References Cited

U.S. PATENT DOCUMENTS 4,101,724 A 7/1978 Heine et al.
6,355,338 B1* 3/2002 Hilmas ................. C04B 35/565
428/297.1
(Continued)

FOREIGN PATENT DOCUMENTS

WO 2018226162 A1 12/2018
WO 2020081007 A1 4/2020
(Continued)

OTHER PUBLICATIONS

Feng, Ziang. "Wearable Power Sources and Self-powered Sensors Based on the Triboelectric Nanogenerators." (Nov. 16, 2020). (Year: 2020).*
(Continued)

*Primary Examiner* — Benjamin A Schiffman
(74) *Attorney, Agent, or Firm* — Perilla Knox & Hildebrandt LLP; Jonathan A. Paulis

(57) ABSTRACT
Aspects of triboelectric fibers and methods of manufacture of the fibers are described. In one example, a method of manufacture of a fiber for generating energy using the triboelectric effect includes forming a preform tube, heating the preform tube in a furnace, feeding a wire through the preform tube and the furnace during the heating, and pulling the wire through the furnace to form a fiber. The methods described herein can be relied upon to manufacture fibers long enough for industrial-scale textile manufacturing,
(Continued)

including for use with industrial-scale looms. In one example, forming the preform tube can include providing a polypropylene tube and wrapping the polypropylene tube with a housing layer of amorphous film, such as acrylic film. The acrylic film can be relied upon to maintain the form and integrity of the polypropylene as the wire is pulled, and the acrylic film can be easily removed after the pulling.

18 Claims, 7 Drawing Sheets

(51) Int. Cl.

| | | |
|---|---|---|
| B29C 48/05 | (2019.01) | |
| B29C 48/154 | (2019.01) | |
| D01D 1/04 | (2006.01) | |
| D01D 5/34 | (2006.01) | |
| D01F 8/06 | (2006.01) | |
| D01F 8/18 | (2006.01) | |
| H02N 1/04 | (2006.01) | |
| B29L 31/00 | (2006.01) | |

(52) U.S. Cl.
CPC ............. *B29C 48/154* (2019.02); *D01D 1/04* (2013.01); *D01D 5/34* (2013.01); *D01F 8/06* (2013.01); *D01F 8/18* (2013.01); *H02N 1/04* (2013.01); *B29K 2995/0003* (2013.01); *B29K 2995/004* (2013.01); *B29L 2031/731* (2013.01); *D10B 2401/18* (2013.01); *D10B 2501/06* (2013.01)

(56) References Cited

U.S. PATENT DOCUMENTS

| | | | | |
|---|---|---|---|---|
| 7,926,171 | B2 * | 4/2011 | Perera ................... | H01B 3/426 |
| | | | | 29/745 |
| 11,965,755 | B2 * | 4/2024 | Lee .......................... | H02N 1/04 |
| 2007/0087209 | A1 | 4/2007 | Farhumand et al. | |
| 2008/0287022 | A1 | 11/2008 | Dhawan et al. | |
| 2009/0260848 | A1 | 10/2009 | Perera et al. | |
| 2012/0031642 | A1 | 2/2012 | Chambers et al. | |
| 2016/0136898 | A1 | 5/2016 | Jang et al. | |
| 2017/0237365 | A1 | 8/2017 | Kwon et al. | |
| 2019/0047240 | A1 | 2/2019 | Sorin et al. | |
| 2020/0283931 | A1 * | 9/2020 | Abouraddy ............... | D01F 1/04 |
| 2022/0255464 | A1 | 8/2022 | Feng et al. | |
| 2023/0208322 | A1 * | 6/2023 | Johnson ................... | H02N 1/04 |
| | | | | 310/310 |
| 2023/0409114 | A1 | 12/2023 | Sun et al. | |
| 2024/0195329 | A1 | 6/2024 | Ying et al. | |

FOREIGN PATENT DOCUMENTS

| | | | |
|---|---|---|---|
| WO | 2021016524 | A1 | 1/2021 |
| WO | 2021222212 | A1 | 11/2021 |

OTHER PUBLICATIONS

Tong, Yuxin, et al. "3D printed stretchable triboelectric nanogenerator fibers and devices." Nano Energy 75 (May 30, 2020): 104973. (Year: 2020).*
International Search Report and Written Opinion for PCTUS2021029350 mailed Aug. 12, 2021.
Feng, "Wearable Power Sources and Self-powered Sensors Based on the Triboelectric Nanogenerators." Diss. Virginia Tech, 2020. Nov. 16, 2020 (Nov. 16, 2020), entire document, [on line] <https:l/vtechworks.lib.vt.edu/bitstream/handle/10919/103020/Feng_Z_D_2020.pdf? sequence=1 &isAllowed=y>, Abstract Only.
Tong et al. "3D printed stretchable triboelectric nanogenerator fibers and devices." Nano Energy 75 (2020): 104973. May 17, 2020 (May 17, 2020), entire document [on line] <https://par.nsf.gov/servlets/purl/10159105>, Abstract Only.
International Search Report and Written Opinion for PCT/US2020/043418 mailed Oct. 16, 2020.
A. Joe Lopes, et al., "Integrating stereolithography and direct print technologies for 3D structural electronics fabrication," Rapid Prototyp J. 18 (2012) 129-143.
A. Yu, et al., "Core-shell-yam-based triboelectric nanogenerator textiles as power cloths," ACS Nano 11 (2017) 12764-12771.
B.N. Johnson, et al., "3D printed anatomical nerve regeneration pathways," Adv. Funct. Mater. 25 (2015) 6205-6217.
B.N. Johnson, et al., "3D printed nervous system on a chip," Lab Chip 16 (2016) 1393-1400.
D. Eshmuminov, et al., "An integrated perfusion machine preserves injured human livers for 1 week." Nat. Biotechnol. (2020) 1-10.
D. Espalin, et al., "3D Printing multifunctionality: structures with electronics," Int. J. Adv. Manuf. Technol. 72 (2014) 963-978.
D. Lei, et al., "4-Axis printing microfibrous tubular scaffold and tracheal cartilage application," Sci. China Mater. 62 (2019) 1910-1920.
E. Macdonald, et al., "3D printing for the rapid prototyping of structural electronics," IEEE Access 2 (2014) 234-242.
F. Yi, et al., "A highly shape-adaptive, stretchable design based on conductive liquid for energy harvesting and self-powered biomechanical monitoring," Sci. Adv. 2 (2016), e1501624.
F.R. Fan, et al., "Flexible nanogenerators for energy harvesting and self-powered electronics," Adv. Mater. 28 (2016) 4283-4305.
G. Costantino, et al., "Improvement of the adhesion of silicone to aluminum using plasma polymerization," J. Inorg. Organomet. Polym. 4 (1994) 425-430.
J. Deng, et al., "Vitrimer elastomer-based jigsaw puzzle-like healable triboelectric nanogenerator for self-powered Wearable electronics," Adv. Mater. 30 (2018) 1705918.
J. Park, et al., "Flexible single-strand fiber-based wovenstructured triboelectric nanogenerator for self-powered electronics," Apl. Mater. 6 (2018) 101106.
J.M. Murbach, et al., "In situ electrochemical polymerization of poly (3, 4-ethylenedioxythiophene)(PEDOT) for peripheral nerve interfaces," MRS Commun. 8 (2018) 1043-1049.
J.Z. Gul, et al., "In situ UV curable 3D printing of multi-material tri-legged soft bot with spider mimicked multi-step forward dynamic gait," Smart Mater. Struct. 25 (2016) 115009.
K. Brigham, et al., "Imagined Speech Classification with EEG Signals for Silent Communication: a Preliminary Investigation into Synthetic Telepathy," 4th iCBBE, 2010, pp. 1-4.
K. Dong, et al., "A highly stretchable and washable all-yam-based self-charging knitting power textile composed of fiber triboelectric nanogenerators and supercapacitors," ACS Nano 11 (2017) 9490-9499.
K. Dong, et al., "Fiber/Fabric-based piezoelectric and triboelectric nanogenerators for flexible/stretchable and wearable electronics and artificial intelligence," Adv. Mater. (2019) 1902549.
K. Parida, et al., "Highly transparent, stretchable, and self-healing ionic—skin triboelectric nanogenerators for energy harvesting and touch applications," Adv. Mater. 29 (2017) 1702181.
K. Wang, et al., "Engineering electroactive dielectric elastomers for miniature electromechanical transducers," Polym. Rev. 57 (2017) 369-396.
M. Pawlaczyk, et al., "Age-dependent biomechanical properties of the skin," Adv. Dermatol. Allergol. 30 (2013) 302.
M. Saari, et al., "Fiber encapsulation additive manufacturing: an enabling technology for 3D printing of electromechanical devices and robotic components," 3D Print. Addit. Manuf. 2 (2015) 32-39.
M. Singh, et al., "3D printed conformal microfluidics for isolation and profiling of biomarkers from whole organs," Lab Chip 17 (2017) 2561-2571.
M. Zhu, et al., "Highly shape adaptive fiber based electronic skin for sensitive joint motion monitoring and tactile sensing," Nano Energy (2020) 104429.
M.J. Taylor, et al., "Current state of hypothermic machine perfusion preservation of organs: the clinical perspective." Cryobiology 60 (2010) S20-S35.
M.S. Mannoor, Z. Jiang, T. James, Y.L. Kong, K.A. Malatesta, W.O. Soboyejo, N. Verma, D.H. Gracias, M.C. McAlpine, 3D printed bionic ears, Nano Lett. 13 (2013) 2634-2639.

(56) References Cited

OTHER PUBLICATIONS

P. Laszczak, et al., "Development and validation of a 3D-printed interfacial stress sensor for prosthetic applications," Med. Eng. Phys. 37 (2015) 132-137.

Q. Zhang, et al., "Green hybrid power system based on triboelectric nanogenerator for wearable/portable electronics," Nano Energy 55 (2019) 151-163.

Q. Zheng, et al., "Biodegradable triboelectric nanogenerator as a life-time designed implantable power source." Sci. Adv. 2 (2016), e1501478.

R. Liu, et al., "Shape memory polymers for body motion energy harvesting and self-powered mechanosensing," Adv. Mater. 30 (2018) 1705195.

S. Chen, et al., "A single integrated 3D-printing process customizes elastic and sustainable triboelectric nanogenerators for wearable electronics," Adv. Funct. Mater. 28 (2018).

S. Choi, et al., "Recent advances in flexible and stretchable bio-electronic devices integrated with nanomaterials," Adv. Mater. 28 (2016) 4203-4218.

S. Li, et al., "All-elastomer-based triboelectric nanogenerator as a keyboard cover to harvest typing energy." ACS Nano 10 (2016) 7973-7931.

S. Wang, et al., "Novel safeguarding tactile e-skins for monitoring human motion based on SST/ PDMS-AgNW-PET hybrid structures." Adv. Funct. Mater. 28 (2018) 1707538.

S.Z. Guo, et al., "3D printed stretchable tactile sensors," Adv. Mater. 29 (2017) 1701218.

T. Hueber, E.-L. Benaroya, et al., "Development of a silent speech interface driven by ultrasound and optical images of the tongue and lips," Speech Commun. 52 (2010) 288-300.

W. Gong, et al., "A wearable, fibroid, self-powered active kinematic sensor based on stretchable sheath-core structural triboelectric fibers," Nano Energy 39 (2017) 673-683.

W. Zeng, et al., "Fiber-based wearable electronics: a review of materials, fabrication, devices, and applications," Adv. Mater. 26 (2014) 5310-5336.

X. Cao, et al., "Triboelectric nanogenerators driven self powered electrochemical processes for energy and environmental science," Adv. Energy Mater. 6 (2016) 1600665.

X. He, et al., "A highly stretchable fiber-based triboelectric nanogenerator for self-powered wearable electronics," Adv. Funct. Mater. 27 (2017) 1604378.

Y. Khan, et al., "Monitoring of vital signs with flexible and wearable medical devices," Adv. Mater. 28 {2016} 4373-4395.

Y. Tong, et al., "A hybrid 3D printing and robotic-assisted embedding approach for design and fabrication of nerve cuffs with integrated locking mechanisms," MRS Adv. 3 (2018) 2365-2372.

Y. Tong, et al., "Low-cost sensor-integrated 3D printed personalized prosthetic hands for children with amniotic band syndrome: a case study in sensing pressure distribution on an anatomical human-machine interface (AHMI) using 3D-Printed conformal electrode arrays," PloS One 14 (2019).

Y.C. Lai, et al., "Electric eel-skin-inspired mechanically durable and super-stretchable nanogenerator for deformable Dower source and fully autonomous conformable electronic-skin applications," Adv. Mater. 28 (2016) 10024-10032.

Y.C. Lai, et al., "Single-thread-based wearable and highly stretchable triboelectric nanogenerators and their applications in cloth-based self-powered human-interactive and biomedical sensing," Adv. Funct. Mater. 27 {2017} 1604462.

Y.L. Kong, et al., "3D printed bionic nanodevices," Nano Today 11 (2016) 330-350.

Y.L. Kong, et al., 3D printed quantum dot light-emitting diodes) Nano Lett. 14 (2014) 7017-7023.

Z. Zhang, et al., "An air-cushion triboelectric nanogenerator integrated with stretchable electrode for human-motion energy harvesting and monitoring," Nano Energy 53 (2018) 108-115.

* cited by examiner

TRIBOELECTRIC FIBERS, GENERATORS, AND SENSORS

CROSS-REFERENCE TO RELATED APPLICATIONS

This application is a 35 U.S.C. § 371 National Stage Patent Application of Patent Cooperation Treaty Application number PCT/US2020/043418, titled "TRIBOELECTRIC FIBERS, GENERATORS, AND SENSORS," filed Jul. 24, 2020, which claims the benefit of and priority to U.S. Provisional Patent Application No. 62/878,450, titled "Wearable Fiber Triboelectric Nanogenerator," filed Jul. 25, 2019, the entire contents of both of which applications are hereby incorporated herein by reference.

BACKGROUND

The triboelectric effect is an effect in which certain materials become electrically charged when contacted with (and re-contacted with, rubbed, etc.) each other. For example, rubbing a balloon or plastic comb on hair, rubbing glass on fur, or rubbing amber on wool, will result in the collection or buildup of electric charge on the surfaces of those materials. The triboelectric series is a list of materials having a greater tendency to exhibit a buildup of positive or negative electric charge. The polarity and strength of the charges produced through the triboelectric effect differ primarily based on the materials used and the overall contact area and, to a lesser extent, temperature, strain, and other factors.

With the era of internet of things (IoT) devices approaching, decentralized electronic systems are more prevalent, and people are equipped with more portable sensors, actuators, and communications interfaces. IoT devices often include low-power processors, sensors, communications interfaces, and other circuitry that rely upon electric energy for operation. However, problems with the supply of electricity, which is essential to the operation of IoT devices, among other types of devices, is slowing the development and adoption of these new devices. Batteries and capacitors, which are typically relied upon to store energy for portable electronic devices, are heavy, bulky, and require regular replacement or recharging.

SUMMARY

In one aspect of the embodiments, a method of manufacture of a fiber for the triboelectric effect is described. The method can include providing a preform tube, heating the preform tube in a furnace, feeding a wire through the preform tube and the furnace during the heating, and pulling the wire through the furnace to form a fiber, the fiber comprising the wire with a coating of material from the preform tube surrounding the wire. In other aspects of the embodiments, additional steps in a method can include weaving the fiber into a textile. The fiber can be woven into a textile, a textile swatch or sheet, or another article by hand or using a loom. Fibers can be formed using the method at lengths suitable for industrial looms.

In other aspects, providing the preform tube can include providing a polypropylene tube, wrapping the polypropylene tube with a housing layer, and baking the polypropylene tube with the housing layer for consolidation. The housing layer can be embodied as a layer of amorphous film. In one example, the housing layer can be embodied as a layer of acrylic film. The method can also include removing the layer of acrylic film from the fiber after the pulling or drawing step.

In other aspects, the furnace can include a tube furnace. The tube furnace can include a number of different heating regions set to different heating temperatures. Further, the wire in the fiber can be embodied as a tungsten wire, although other types of metals can be relied upon for the wire. The tungsten wire can have a diameter of about 50 μm in one example case, and the fiber can have a diameter of between about 150-1000 μm. The pulling can be conducted at a speed of up to 10 meters per minute. Further, the pulling can include pulling over a kilometer of the wire through the furnace, continuously, to form a continuous strand of the fiber for several hundreds of meters or over a kilometer long.

In other aspects of the embodiments, the method can also include weaving the fiber into a textile, and incorporating the textile into an article of clothing as at least one of a triboelectric generator or a triboelectric sensor. Additionally, the method can also include incorporating a segment of the fiber into an article of clothing in a plurality of different locations as at least one of a triboelectric generator or a triboelectric sensor at each location. The triboelectric sensor can be embodied a sensor for at least one of a pedometer, a sitting sensor, or a communications interface, among other sensors.

In another embodiment, a fiber for the triboelectric effect is described. The fiber includes a central core of wire, and a cladding layer of polymer material, wherein the fiber is formed to a length of over one hundred meters in a thermal drawing process. In one example, the polymer material can be embodied as polypropylene, although other types of polymer material(s) can be relied upon. In one case, the wire can be embodied as a tungsten wire with a diameter of about 50 μm, and the fiber can have a diameter of between about 150-1000 μm.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

Figure 1:
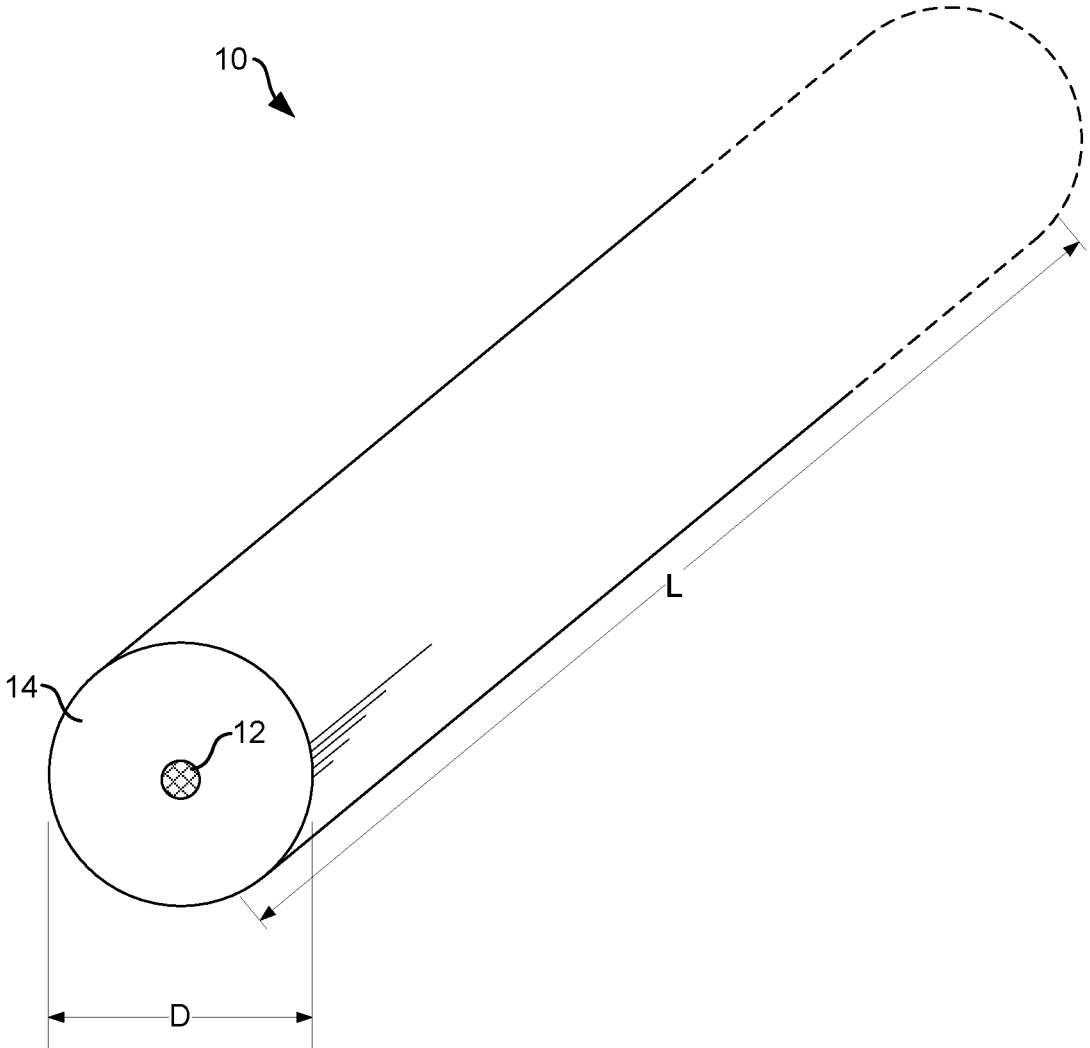
FIG. 1 illustrates an example fiber suitable for the generation of electric energy through the triboelectric effect according to various examples described herein.

As noted above, electricity is essential to the operation of electronic devices including IoT and other portable devices with sensors, actuators, and communications interfaces. Batteries and capacitors, which are typically relied upon to store energy for portable devices, are heavy, bulky, and require regular replacement or recharging. Researchers have been seeking power sources that are lightweight, miniature, distributed, deployable, and regenerative.

A variety of wearable energy harvesting devices have been demonstrated in recent years, including solar energy, thermoelectric, triboelectric, and piezoelectric energy generators. Among them, fiber-based triboelectric generators or nanogenerators, in single-electrode mode, provide one of the best solutions due to the excellent wearability, ease of deployment, high efficiency, low cost, and other benefits of the generators. Wearable energy harvesters based on the triboelectric effect and electrical induction appear to be good overall candidates for power generation, because they aim to collect ambient energy and can be integrated into clothing or accessories. In addition to providing an independent supply of power, they can also be embedded into IoT devices or even serve as self-powered sensors in the devices themselves as described herein.

A triboelectric generator generates energy based on the triboelectrification that occurs when two different objects contact each other. In one sense, mechanical energy is transduced into electricity with an electrical induction effect inside the electrode of the triboelectric generator. Fiber-based triboelectric generators provide a good solution for the generation of electrical energy. Fiber-based triboelectric generators are relatively efficient, easy to integrate into clothing and other articles ubiquitous in everyday life, durable, low cost, and ecologically-friendly. Compared with other forms of triboelectric generators, fiber-based triboelectric generators can be woven into fabrics as wearable devices, offering good compactness and comfortability.

Ideally, triboelectric fibers should be loom-friendly, meaning that they need to be thin and soft enough to form flexible fabrics, yet strong enough to survive pulling, beating, and bending forces. Additionally, industrial looms generally need fibers of hundreds of meters long to weave large and seamless sheets of material. At the same time, for wearable devices, washability, durability, and breathability are also important standards to evaluate performance. Such requirements pose special challenges in manufacturing processes for fiber-based triboelectric generators in terms of fiber selection, diameter control, scalability, and productivity. Currently, many fiber-based triboelectric generators rely upon rigid metal strands as electrodes, which are not desirable as textiles.

Conventionally, it has not been possible to manufacture the types of fibers desirable for fiber-based triboelectric generators at a suitable length for use in industrial-style looms with conventional practices. Among other favorable characteristics, good triboelectric fibers are of relatively thin diameter, consistent diameter, flexible, compliant, washable, and durable. Additionally, good triboelectric fibers would be relatively long, such as several hundred meters or longer, for use with industrial manufacturing techniques. The currently-available triboelectric fibers are much shorter and lack many of these desired characteristics. Thus, without the ability to manufacture triboelectric fibers of sufficient length for large-scale textile manufacturing solutions, it has been impractical and costly to manufacture fiber-based triboelectric generators of large size.

Overall, scalability and productivity are limiting the manufacture of fiber-based triboelectric generators. Triboelectric fibers compatible with industrial looms have yet to be developed. The coating methods widely used to manufacture triboelectric fibers suffer from complicated processes, low speeds, short single fiber lengths, and small yields. Furthermore, many triboelectric generators enlarge the contact area by involving nanomaterials, which will easily degrade after wearing and washing, resulting in unstable output after long-term use. Such drawbacks limit the ability to form larger fiber-based triboelectric generators and, therefore, many fiber-based triboelectric generators are hand woven as small swatches of material for short-term use.

In the context outlined above, aspects of new triboelectric fibers and methods of manufacture of the fibers are described herein. In one example, a method of manufacture of a fiber for generating energy using the triboelectric effect and electrical induction includes forming a preform tube, heating the preform tube in a furnace, feeding a wire through the preform tube and the furnace during the heating, and pulling the wire through the furnace to form a fiber. The methods described herein can be relied upon to manufacture fibers long enough for industrial-scale textile manufacturing, including for use with industrial-scale looms. In one example, forming the preform tube can include providing a polypropylene tube and wrapping the polypropylene tube with a housing layer of amorphous film, such as acrylic film. The acrylic film can be relied upon to maintain the form and integrity of the polypropylene as the wire is pulled, and the acrylic film can be easily removed after the pulling.

According to the embodiments described herein, a thermal drawing process (TDP) is introduced to produce triboelectric fibers compatible with industrial looms and having other desirable characteristics. The diameter of the polymer-based cladding and metal core of the fibers is reduced as compared to conventional fibers, down to as low as about 150 μm, and the length of the fibers has been scaled up significantly. Both hand-woven and loom-woven swatches of textile material incorporating the fibers have been demonstrated to exhibit good flexibility, stretch-ability, power density, stability, washability, and breathability. In addition to serving as power sources for various types of devices, the swatches of material have been used as self-powered sensors for body motion monitoring and communication. These applications show that the thermally-drawn triboelectric fibers can be relied upon to form powerful and reliable wearable devices in modern electronics.

Fiber-based triboelectric generators formed using the fibers described herein can easily harvest different kinds of energy such as body motion, vibration, and wind that are usually wasted. Compared with other types of wearable triboelectric generators, the fiber-based triboelectric generators described herein can be embedded into textiles and clothing. Moreover, working in the single-electrode mode, the generators do not need rigid spacers, such as metal springs, commonly used in other triboelectric generators, making the generators flexible and comfortable. Also, the triboelectric fibers described herein can be woven into textile swatches a number of different ways to realize many different types of functional materials, expanding the ability for future aesthetic needs.

As part of the TDP process described herein, a relatively bulky preform with a customized structure is heated in a furnace above the glass transition point of the material, and high stress is applied to elongate the preform into a thin fiber on a large scale. The resulting fiber includes a core-cladding structure, in which a tungsten wire, in one example, serves as an electrode in the fiber, and a polymer cladding generates triboelectrification around the metal wire core.

Both semicrystalline and amorphous materials can be drawn using the TDP process. Thus, the process has been demonstrated using both polypropylene (PP) (e.g., a semicrystalline) and polycarbonate (PC) (e.g. an amorphous) cladding materials. Continuous triboelectric fibers with diameters down to as low as about 150 μm and lengths of 100 meters or more have been formed using the process, with both types of cladding materials. In one example, the drawing speed of the TDP process is up to 10 meters per minute, although slower or faster speeds can be relied upon. Both hand-woven and loom-woven material swatches have been demonstrated, and both exhibit good flexibility and stretch-ability. The output power densities of the example material swatches peaked at 43.0 mW per kilogram and 67.4 mW per kilogram for PP and PC cladding, respectively. A series of 62 commercial light-emitting diodes (LEDs) can be readily lit up by rubbing a ~20 cm2 swatch on a cotton shirt.

The durability, washability, and breathability of the materials formed using the triboelectric fibers described herein demonstrate that they are good candidates for fiber-based triboelectric generators and for clothing components. In addition to serving as power sources, the materials can operate as self-powered sensors. As examples, the materials can serve as wearable biosensors, pedometers, sitting timers, and other types of sensors. As other examples, the materials can operate as Morse code generators for communications. Thereby, the thermally drawn triboelectric fibers described herein can be woven into multifunctional textiles and clothing. The versatility of this platform of fibers can be relied upon for broad applications in the field of IoT and other devices.

Turning to the drawings for a detailed description of the embodiments, FIG. 1 illustrates an example fiber 10 for the generation of electric energy through the triboelectric effect and electrical induction according to various examples described herein. The fiber 10 is provided as a representative example in FIG. 1 and is not necessarily drawn to scale. As shown, the fiber 10 includes a central core 12 and a cladding layer 14 surrounding the central core 12. As described in further detail below, the fiber 10 can be formed at a significant length, "L," of hundreds of meters or even a kilometer or more. At such lengths, the fiber 10 can be used to form large sheets of material using industrial looms. Depending upon the mode of manufacture (e.g., with primary factors being heat and draw speed), the diameter "D" of the fiber 10 can be as low as about 150 μm in one example. The diameter "D" of the fiber 10 is not limited to 350 μm, however, and can range from about 150 μm to 1000 μm or larger depending upon the type and purpose of the materials being made from the fiber 10.

The central core 12 can be embodied as a core of metal, such as tungsten. In other examples, the central core 12 can be embodied as copper, stainless steel, aluminum, bismuth, tin, or another metal. The diameter of the central core 12 can be about 50 μm in one example. The diameter of the central core 12 is not limited to 50 μm, however, and can range from about 50 μm to 200 μm or larger depending upon the type and purpose of the materials being made from the fiber 10. In other examples, the central core 12 can be a conductive liquid, including mercury, gallium, a solution of sodium chloride (NaCl), or other conductive liquids.

The cladding layer 14 can be embodied as a polymer. In one example, the cladding layer 14 can be embodied as a semicrystalline polymer, such as polypropylene, low density polyethylene (LDPE), high density polyethylene (HDPE), thermoplastic elastomer (TPE), or another semicrystalline polymer. In another example, the cladding layer 14 can be embodied as an amorphous polymer, such as polycarbonate, polyethylenimine (PEI), thermoplastic elastomer (TPE), or another amorphous polymer.

Based on the materials from which the fiber 10 is formed, the fiber 10 is designed as a triboelectric fiber, and it can be used to form fiber-based triboelectric generators. When manufactured according to the process described below with reference to FIG. 3, the fiber 10 is also soft and flexible enough to form fabric or textile materials of desirable quality. The fiber 10 is also strong enough to survive the pulling, beating, and bending forces typical in industrial looms, as well as washable and durable.

Figure 2:
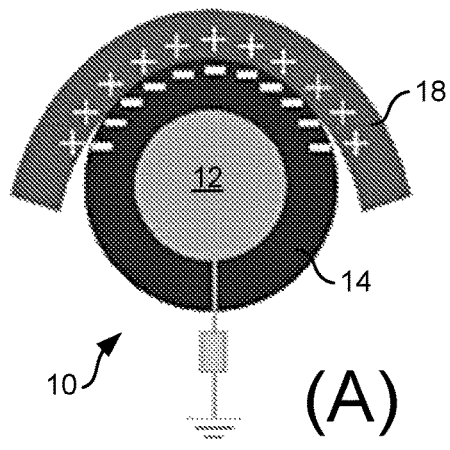
FIG. 2 illustrates an example of the generation of electric energy through the triboelectric effect according to various examples described herein.
Figure 2:
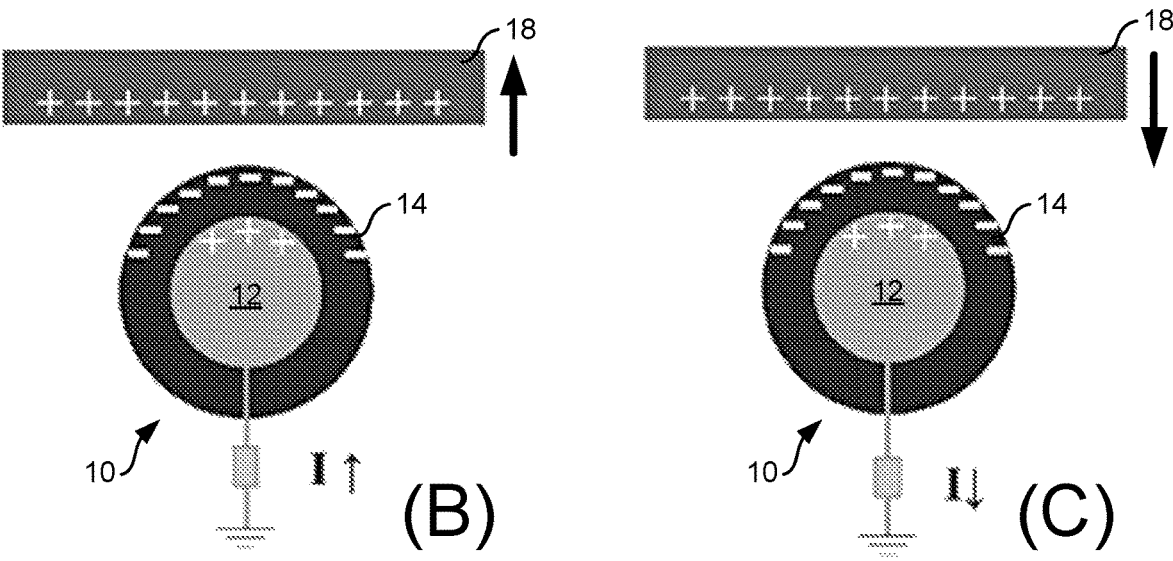

FIG. 2 illustrates an example of the generation of electric energy through the triboelectric effect and electrical induction using the fiber 10 according to various examples described herein. The fiber 10 is provided as a representative example in FIG. 2 and is not necessarily drawn to scale. The fiber 10 can be used in the single-electrode mode with one end of the central core 12 of the fiber 10 coupled to ground as shown. As for the triboelectric effect, in (A) of FIG. 2, when an external material 18 (e.g., nylon, leather, etc.) contacts (or nearly contacts) the cladding layer 14 of the fiber 10, the triboelectric effect takes place, and negative charges will transfer to and accumulate on the surface of the cladding layer 14.

When the external material 18 is separated from the cladding layer 14 as shown in (B) of FIG. 2, the electrostatic induction effect is triggered, because of the time-varying potential created by the accumulated electrons. Current will flow from ground to the interface between the cladding layer 14 and the central core 12 of the fiber 10 as the separation increases. When the external material 18 and the surface of the cladding layer 14 again approach or contact each other as shown in (C) of FIG. 2, the current will flow back to ground. Such current flow will occur over time with iterative phases of movement, contact, and/or separation between the external material 18 and the surface of the cladding layer 14 of the fiber 10.

Figure 3:
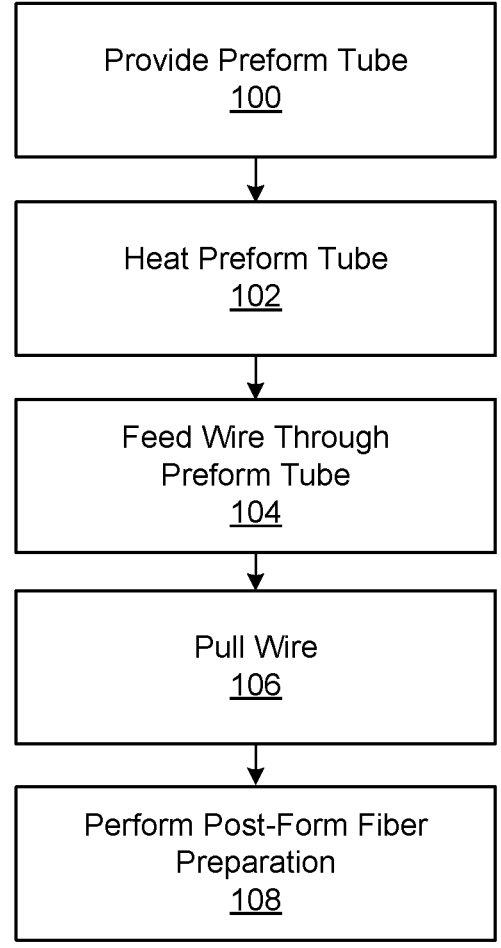
FIG. 3 illustrates an example process for the manufacture of the fiber shown in FIG. 1 according to various examples described herein.

FIG. 3 illustrates an example process for the manufacture of the fiber 10 shown in FIG. 1 according to various examples described herein. The process is shown as a representative example in FIG. 3 and is not exhaustive. That is, additional steps can be included in the process, although not expressly identified in FIG. 3. The order of one or more steps shown in FIG. 3 can also be altered in some cases, and one or more of the steps shown in FIG. 3 can be omitted. Some of the steps shown in FIG. 3 are also described with reference to FIG. 4 for additional context.

Figure 4:
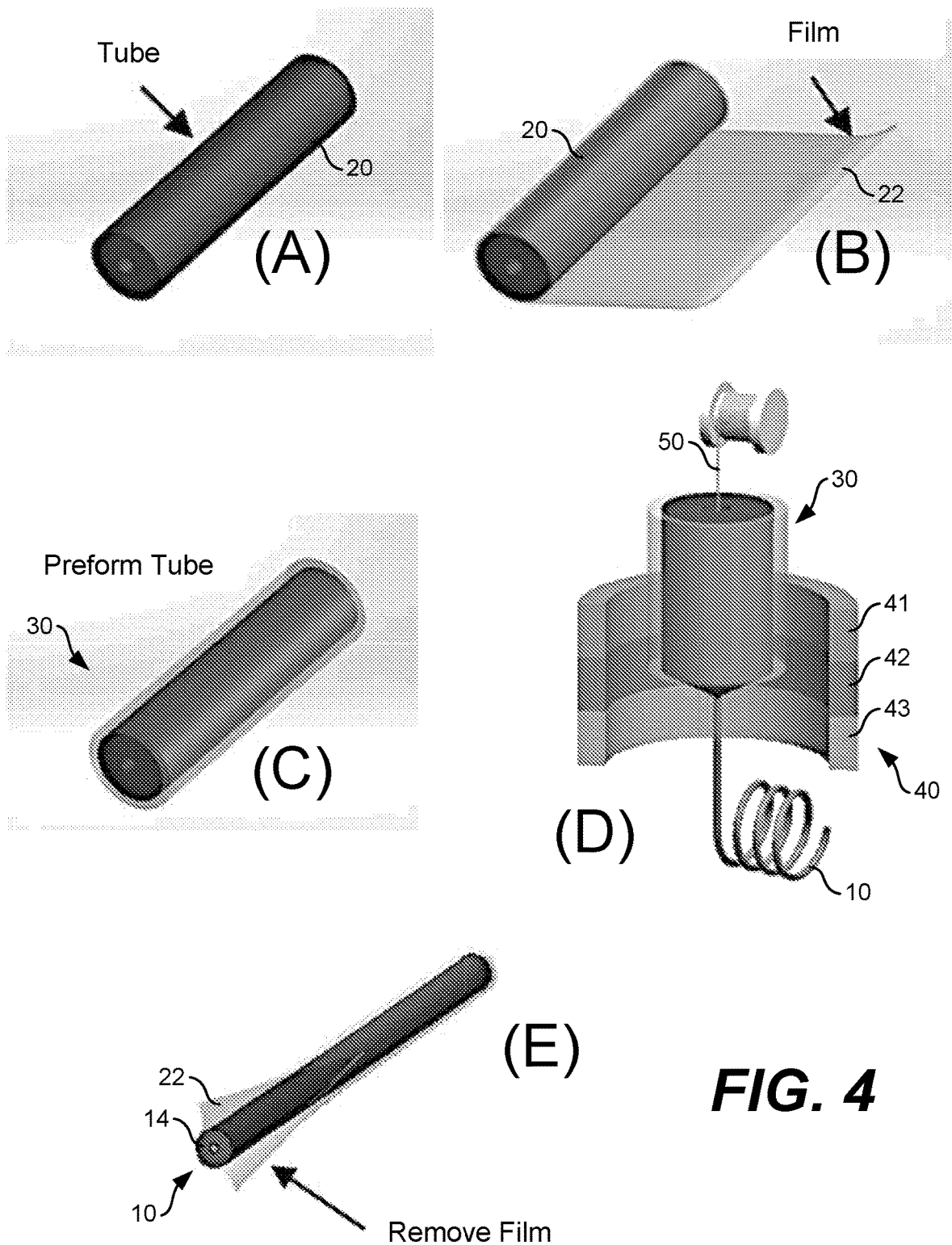
FIG. 4 illustrates the fiber shown in FIG. 1 at certain steps in the process shown in FIG. 3 according to various examples described herein.

At step 100, the process includes providing a preform tube. The preform tube can be embodied as either a semicrystalline or amorphous material. Thus, step 100 can include providing a tube of PP, LDPE, HDPE, or another semicrystalline polymer. In one particular example, the McMaster-Carr® part number 1859T16 PP tube can be provided (e.g., sourced) at step 100. The 1859T16 PP tube has an outer diameter of ¾ inch, a PP wall thickness of ¼ inch, and can be sourced in lengths of 1-5 feet or longer. However, tubes of other outer diameters and wall thicknesses, such as the McMaster-Carr® part numbers 1859T11, 1859T12, 1859T17, 1859T18, 1859T22, and 1859T23, can be relied upon. Polypropylene can be selected for the preform tube for a number of reasons. First, polypropylene is located at the negative end of the triboelectric series, meaning that most clothing materials (e.g., cotton, polyester, etc.) and human skin and hair are more likely than it to lose electrons, thus offering a large amount of electron transfer. Second, polypropylene is hydrophobic, resulting in good washability. Third, polypropylene is soft enough to be embedded in a fabric while strong enough to maintain integrity during loom-weaving processes. In other examples, the forming at step 100 can include providing a tube of PC, PEI, TPE, or another amorphous polymer of suitable diameter and wall thickness. In FIG. 4, the tube 20 (which ultimately forms the cladding layer 14 in the fiber 10) is shown in (A).

For semicrystalline tube materials such as polypropylene, step 100 can include both providing (or sourcing) the tube 20 and also wrapping the tube 20 with a housing layer, to arrive at the preform tube. When heated above its melting point, the semicrystalline polypropylene material in the preform tube can experience a drastic drop in viscosity. Because low viscosity materials can easily flow under the applied stress during later drawings steps, neckings that can lead to breaks or fractures can be formed. To address this challenge, a housing layer 22 can be applied as a restriction boundary for the polypropylene at step 100. The housing layer 22 can include a layer of amorphous film, such as a layer of acrylic film, to enclose and guide the semicrystalline material of the tube 20 when heated and drawn during later process steps. Acrylic, a typical amorphous material, is a good candidate because such materials can maintain stable diameters during drawing. The acrylic film can be embodied as the SolaTuf® impact modified acrylic film, for example. Thus, the preform tube can include a combination of two or more different materials.

In FIG. 4, the tube 20 and housing layer 22 are shown in (B). As shown in (B), step 100 can include wrapping the housing layer 22 around the tube 20, to form the preform tube 30 as shown in (C). Step 100 can also include baking the tube 20 and the housing layer 22 in an oven for consolidation. As one example, the tube 20 and the housing layer 22 can be baked for 30 min at 140° C. The housing layer 22 and wrapping the tube 20 can be omitted from step 100 in some cases. For example, the housing layer 22 can be omitted if the tube 20 is an amorphous material, such as a tube of PC, PEI, or TPE, which lacks the long-range order characteristics of semicrystalline materials. Finally, step 100 can include cutting or machining the preform tube 30 to a particular length for later process steps. For example, the preform tube 30 can be cut to a length of 10 cm, 15 cm, 20 cm, 25 cm, or longer, depending upon the length of the resulting fiber being manufactured.

Referring to FIG. 3, step 102 includes heating the preform tube 30 in a furnace. As shown in (D) of FIG. 4, the preform tube 30 can be oriented vertically, inserted at one end into a tube furnace 40, and heated in the tube furnace 40. The tube furnace 40 includes three different heating regions 41-43. For the 1859T16 PP tube, the upper heating region 41 can be set to a temperature of about 145° C., the middle heating region 42 can be set to a temperature of about 245° C., and the lower heating region 43 can be set to a temperature of about 100° C. In other examples, however, the tube furnace 40 can include one, two, or more than three different heating regions. Additionally, the temperatures of the heating regions can vary, respectively, as compared to that described above depending upon the composition and size of the tube 20, the drawing speed, and other factors.

At step 104 in FIG. 3, the process includes feeding a wire through the preform tube 30 and the tube furnace 40 during the heating. As shown in (D) of FIG. 4, the wire 50 is inserted into the opening at one end of the preform tube 30 and extended through the preform tube 30 at step 104. In one example, the wire 50 can be a tungsten wire, such as McMaster-Carr® part number 3775K11, although other types of wire, including stainless steel, aluminum, copper, or others can be relied upon. The wire 50 can range in diameter, depending upon the type of triboelectric fiber being manufactured. If a tungsten wire is used, a preferred diameter may be 50 µm, for example, although other diameters can be used. Diameters within the range of about 50-80 µm can be suitable for triboelectric fibers for wearable triboelectric generators.

At step 106 in FIG. 3, the process includes pulling the wire 50 through the tube furnace 40 to form the fiber 10. During the pulling at step 106, the material from the preform tube 30 will attach and adhere to the wire 50 during the thermal drawing process. The pulling or drawing at step 106 can be performed at a suitable speed based on certain factors, such as the flow characteristics of the preform tube 30, the temperatures in the tube furnace 40, and the desired rate of manufacture of the fiber 10. Draw speeds of ten meters per minute or more have been successfully achieved, although slower or faster draw speeds can be relied upon. Faster draw speeds are also possible. In one preferred example, step 106 can include pulling over a kilometer of the wire 50 through the tube furnace 40, continuously, to form a continuous strand of the fiber 10 over a kilometer long. The fiber 10, which results from step 106, comprises the wire 50 with a coating of material from the preform tube 30 surrounding the wire 50. The wire 50 forms the central core 12 of the fiber 10, and the material from the preform tube 30 comprises the cladding layer 14.

At step 108 in FIG. 3, the process includes performing post-form fiber processing preparation. For example, as shown in (E) of FIG. 4, the process can include removing the housing layer 22 from around the cladding layer 14 of the fiber 10. Additionally, as needed, the fiber 10 can be cut or machined to a certain length, wound on a spool, or otherwise prepared in any necessary fashion. The resulting fiber 10 can have a diameter of about 350 µm and a weight of about 0.11 grams per meter using the preferred materials identified above, as one example. Diameters within a range of about 300-400 µm and similar weights can also be achieved in other preferable cases, which is comparable to the diameters of threads or yarns commonly used on industrial looms.

The process shown in FIG. 3 can be relied upon to form the fiber 10 at higher speeds and much longer lengths than conventional methods used to form other types of triboelectric fibers. The fiber 10 can be formed at a significant length of hundreds of meters or even a kilometer or more using the process shown in FIG. 3. At such lengths, the fiber 10 can be used to form large sheets of material using industrial looms. The fiber 10 also possesses other desirable characteristics, such as being flexible, soft, durable, and washable, among others. The small diameter and weight, high scalability, productivity, and flexibility, along with the softness, contribute to the excellent weave-ability of the fiber 10.

Figure 5:
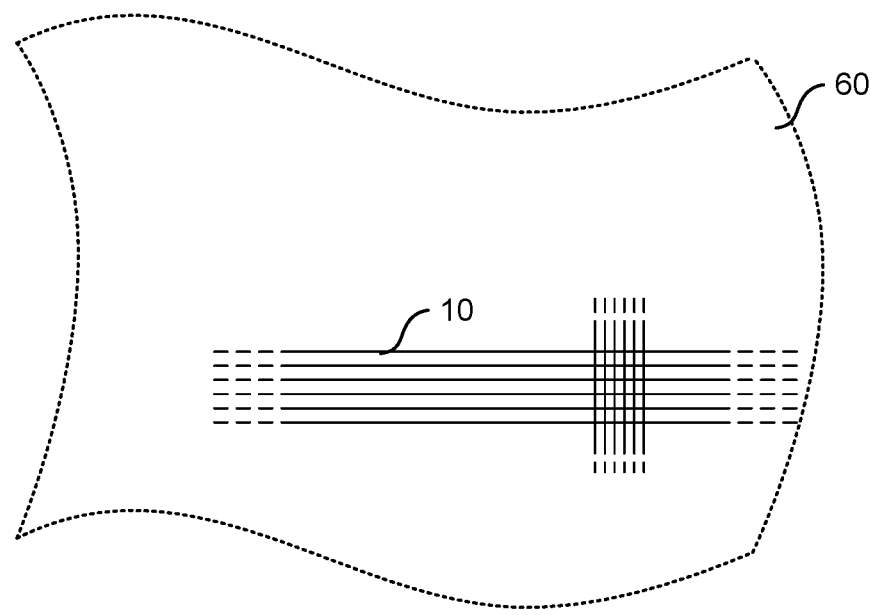
FIG. 5 illustrates the fiber shown in FIG. 1 woven into material according to various examples described herein.

Additional steps can include weaving the fiber 10 into a swatch or sheet 60 of material, such as a textile sheet. As shown in FIG. 5, the fiber 10 can be woven into a swatch or sheet 60 of material of any size, possibly along with threads of other conventional types of materials. The fiber 10 can be woven into the sheet 60 by hand or using an industrial loom or other high-speed manufacturing technique. In a preferred example, the fiber 10 can be woven into the sheet 60 as the warp, and other types of materials can be woven into the sheet as the weft. In another example, the fiber 10 can be woven into the sheet 60 as the weft, and other types of materials can be woven into the sheet as the warp. The fiber 10 can also be used in a variety of different weave patterns, including plain, twill, satin, basketweave, Jacquard, Dobby, cross, or other patterns. Thus, various articles of clothing can be formed using the sheet 60, and such articles can be used as a triboelectric generator. Tests have shown that materials woven with the fiber 10 can be easily folded, both horizontally and vertically, and stretched diagonally, as well as washed without interfering with the ability of the material as a triboelectric generator.

Figure 6:
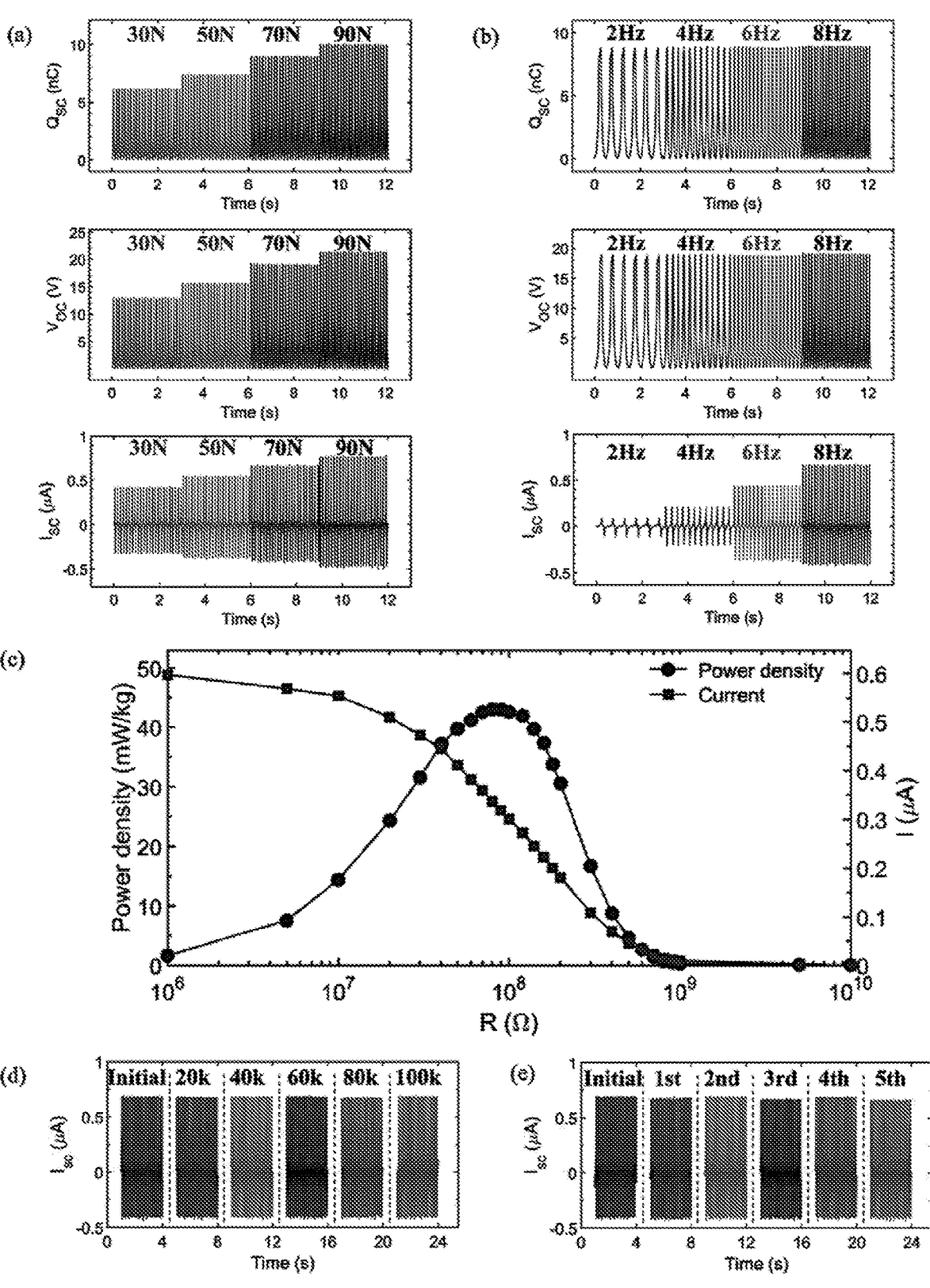
FIG. 6 illustrates electrical output testing for a swatch of materials including the fiber shown in FIG. 1 according to various examples described herein.

The electrical output of triboelectric generator swatches including fibers similar to the fiber 10 were quantitatively tested. FIG. 6 illustrates electrical output testing for a triboelectric generator swatch including the fiber 10 shown in FIG. 1. A 1-inch×1-inch (25.4 mm×25.4 mm) nylon plate was driven by a linear motor to apply cyclical forces on the swatch. FIG. 6 shows the electrical output for applied forces of 30 N, 50 N, 70 N, and 90N and for cycle frequencies of 2 Hz, 4 Hz, 6 Hz, and 8 Hz.

When the cycle frequency was fixed at 8 Hz as shown in (a) of FIG. 6, the short-circuit transferred charge ($Q_{SC}$) went from 6.2 nC to 10.0 nC when the force was increased from 30 N to 90 N. This change was because a larger force will result in a larger contact area and, subsequently, stronger triboelectrification. As both the open-circuit voltage ($V_{OC}$) and the maximum short-circuit currents ($I_{SC}$) are dependent on the charge amount, they also increased when the force increased, going from 12.9 V and 0.42 μA to 21.4 V and 0.78 μA, respectively.

When the applied force was fixed at 70 N as shown in (b) of FIG. 6, $Q_{SC}$ and VOC remain constant around 8.8 nC and 18.9 V, respectively. The peak $I_{SC}$ increased from 0.11 μA to 0.68 μA when the moving frequency increased from 2 Hz to 8 Hz. This significant change was based on the formula: I=Q/t. Since $Q_{SC}$ was nearly a constant in this test series, $I_{SC}$ was inversely proportional to the frequency. When the force and frequency were fixed at 70 N and 8 Hz, the electrical output current was measured with different external loads, and the power density (PD) was accordingly calculated as follows:

$$PD = \frac{I^2 R}{m}, \qquad (1)$$

where I is the maximum current, R is the external resistance, and m is the mass of the functioning triboelectric generator.

There is currently no universal standard to evaluate the electrical output of fabric-based triboelectric generators. Power per area is one metric used for evaluation, but power per weight accounts for additional factors and is relied upon herein. The PD of the triboelectric generator swatch tested peaked at 43.0 mW per kg with an external load of 80 MΩ, as shown in (c) of FIG. 6.

To evaluate the durability of the triboelectric generator swatch, a cyclic test was performed for 100,000 cycles. The results are shown in (d) of FIG. 6, and indicate no obvious change of electric output in terms of $I_{SC}$. Additionally, in the washability tests shown in (e) of FIG. 6, a contaminant was first poured onto the triboelectric generator swatch, and the triboelectric generator swatch was then washed with flowing water and naturally dried. The output was stable after each wash cycle as shown.

To evaluate the breathability of the triboelectric generator swatch, air permeability tests following ASTM D737 were also performed with a commercial air permeability tester.

Under the pressure of 125 Pa, the air permeability of the swatch was 523.0 cm³ per second. This good breathability is because of the space between the fibers and the slick surfaces of the fiber claddings.

The electrical output of a triboelectric generator swatch formed with a fiber of PC cladding was also quantified, demonstrating the same trends as shown in FIG. 6. When the cycle frequency was fixed at 8 Hz, $Q_{SC}$, $V_{OC}$, and $I_{SC}$ went up from 10.77 nC, 21.8 V, and 0.55 μA to 15.2 nC, 30.6 V, and 0.96 μA, respectively. When the applied force was fixed at 70 N, $Q_{SC}$ and $V_{OC}$ stabilized around 14.1 nC and 27.8 V, and $I_{SC}$ went up from 0.14 μA to 0.86 μA. The highest PD was 67.4 mW per kg, and it showed good durability, washability, and breathability.

In practice, the electrical output of a triboelectric generator formed using the fiber 10 can be consumed instantly or stored for later use. In one test, a series of over sixty light emitting diodes (LEDs) were directly powered and lit by a triboelectric generator swatch incorporating the fiber 10. The brightness of the LEDs was dependent on the current generated. In another test, a number of different capacitors, of 0.1 μF, 0.22 μF, and 0.47 μF, were charged by a triboelectric generator swatch incorporating the fiber 10, For the capacitors, a saturation voltage of 55 V was reached with charging times of 0.8 min, 1.8 min, and 3.6 min, respectively. The charging time is determined by the following formula:

$$Q=CU=It, \qquad (2)$$

where Q is the charge stored in the capacitor, C is the capacitance, U is the saturation voltage, I is the charging current, and t is the charging time. In another test, the energy stored in a capacitor was used to power a commercial liquid crystal display calculator. In practical applications, the forces and speeds applied to triboelectric generators can easily exceed the ones used in the tests. Thus, larger electrical outputs can be expected in some cases.

In other practical applications, one or more fiber-based triboelectric sensors formed with the fiber 10 can be directly relied upon as one or more sensors. The sensors can be distributed on articles of clothing, for example, at multiple points of the body while being locally powered. A distributed group of such sensors has advantages over a single sensor, because the distributed group offers additional feedback for activity classification, by monitoring the movements of different locations on the body. Additionally, fiber-based triboelectric sensors can be more comfortable than traditional accessory-based sensors, such as watches and glasses, because they are flexible and lightweight.

Figure 7:
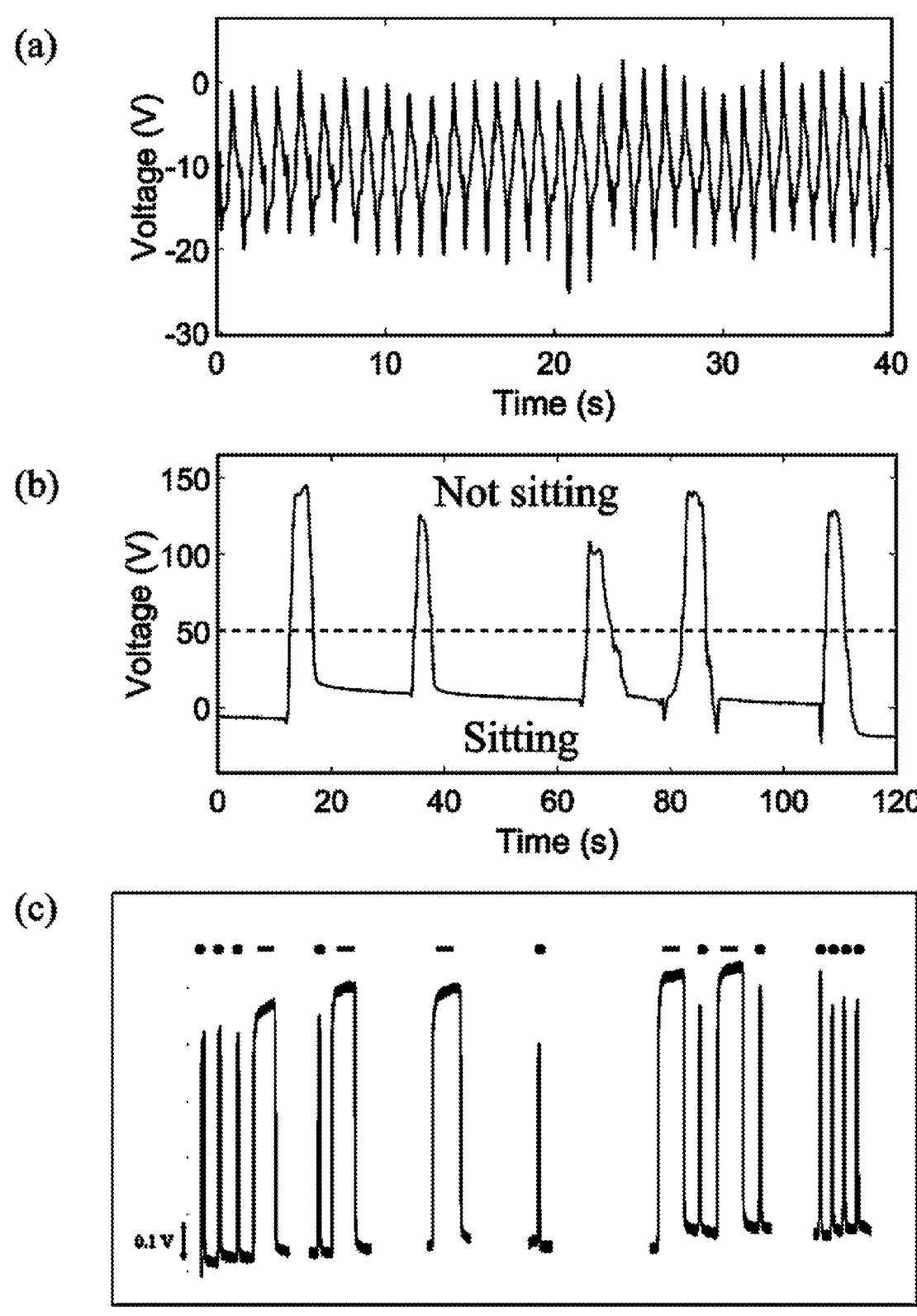
FIG. 7 illustrates outputs from self-powered fiber-based triboelectric sensors including the fiber shown in FIG. 1 according to various examples described herein.

According to aspects of the embodiments, self-powered fiber-based triboelectric sensors have been demonstrated for the purposes of bio-monitoring and communication, among other practical applications. In that context, FIG. 7 illustrates outputs from self-powered fiber-based triboelectric sensors including the fiber 10 shown in FIG. 1 according to various examples described herein. In one example, fiber-based triboelectric sensors were incorporated with an article of clothing at the backside and the inner sides of the leg for movement sensing. At the inner side, the sensor was used as a pedometer by sensing the relative movement between the legs. Because the open-circuit voltage is proportional to the distance between the legs, each step corresponds to a peak in (a) of FIG. 7.

At the backside, the sensor was used as a sitting timer by sensing the relative distance between the leg and a chair. When the leg approached the chair, the open-circuit voltage decreased accordingly, and vice versa. These voltages are shown in (b) of FIG. 7 A sitting voltage threshold could be set by a user to tailor the responsiveness of the sensor. Another potential use of a fiber-based triboelectric sensor is to extract Morse codes generated by tapping the sensor. In (c) of FIG. 7, the dots and dashes in voltage curves can be controlled by the contacting time with such a sensor. Thus, the fiber-based triboelectric sensor can be relied upon as a type of communications interface.

With the length of the fiber 10 that can be achieved according to the process described herein, sensors incorporating the fiber 10 can be useful for long-distance communications in emergencies (e.g., earthquake and oil well explosion) and other scenarios in which plant power and other electronics are damaged. In these cases, the fiber-based self-powered sensors offer accuracy, customization, comfortability, and security. Overall, the sensors can be used to track body motions with good flexibility and little added weight. Also, the sensors offer an efficient way for emergency communications. With fiber-based triboelectric generators incorporating the fiber 10, it is possible to harvest energy and power electronics in a distributed fashion. Fiber-based triboelectric sensors incorporating the fiber 10 also offer versatility as self-powered sensors for biological feedback and communications. These features can be seamlessly integrated into clothing and other articles, without interfering with the activities of users.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

Therefore, the following is claimed:

1. A method of manufacture of a triboelectric fiber, comprising:
   providing a preform tube;
   heating the preform tube in a tube furnace, the tube furnace comprising three different heating regions, wherein the three different heating regions comprise an upper heating region set to about 145° C., a middle heating region set to about 245° C., and a lower heating region set to about 100° C;
   feeding a wire through the preform tube and the tube furnace during the heating; and
   pulling the wire through the tube furnace to form the triboelectric fiber, wherein during the pulling, material from the preform tube attaches and adheres to the wire, the triboelectric fiber comprising the wire with a coating of material from the preform tube surrounding the wire.

2. The method of manufacture of claim 1, further comprising weaving the triboelectric fiber into a textile using a loom.

3. The method of manufacture of claim 1, wherein providing the preform tube comprises:
   providing a semicrystalline polymer tube comprising polypropylene;
   wrapping the semicrystalline polymer tube with a housing layer; and
   baking the semicrystalline polymer tube with the housing layer for consolidation.

4. The method of manufacture of claim 3, wherein the housing layer comprises a layer of amorphous film.

5. The method of manufacture of claim 3, wherein the housing layer comprises a layer of acrylic film to enclose and guide the semicrystalline polymer when heated and drawn.

6. The method of manufacture of claim 5, further comprising removing the layer of acrylic film from the triboelectric fiber.

7. The method of manufacture of claim 1, wherein the wire comprises a tungsten wire.

8. The method of manufacture of claim 1, wherein the wire comprises a tungsten wire with a diameter of about 50 μm.

9. The method of manufacture of claim 1, wherein the triboelectric fiber comprises a diameter of between about 150-1000 μm.

10. The method of manufacture of claim 1, wherein pulling the wire comprises pulling at a speed of up to 10 meters per minute.

11. The method of manufacture of claim 1, wherein the pulling comprises pulling over a kilometer of the wire through the tube furnace, continuously, to form a continuous strand of the triboelectric fiber over a kilometer long.

12. The method of manufacture of claim 1, further comprising:
   weaving the triboelectric fiber into a textile;
   weaving a different material into the textile; and
   incorporating the textile into an article of clothing as at least one of a triboelectric generator or a triboelectric sensor.

13. The method of manufacture of claim 12, wherein:
   the triboelectric sensor comprises a sensor for at least one of a pedometer, a sitting sensor, or a communications interface.

14. The method of manufacture of claim 1, further comprising incorporating a segment of the triboelectric fiber into an article of clothing in a plurality of different locations as at least one of a triboelectric generator or a triboelectric sensor at each location.

15. A method of manufacture of a triboelectric fiber, comprising:
   providing a semicrystalline polymer tube;
   wrapping the semicrystalline polymer tube with a housing layer to form a preform tube;
   heating the preform tube in a tube furnace, the tube furnace comprising three different heating regions, wherein the three different heating regions comprise an upper heating region set to about 145° C . . . a middle heating region set to about 245° C., and a lower heating region set to about 100° C . . . ;
   feeding a wire through the preform tube and the tube furnace during the heating; and
   pulling the wire through the tube furnace to form the triboelectric fiber, wherein during the pulling, material from the preform tube attaches and adheres to the wire, the triboelectric fiber comprising the wire with a-coating of material from the preform tube surrounding the wire.

16. The method of manufacture of claim 15, further comprising:
   weaving the triboelectric fiber into a textile; and
   weaving a different material into the textile.

17. The method of manufacture of claim 16, further comprising incorporating the textile into an article of clothing as at least one of a triboelectric generator or a triboelectric sensor.

18. The method of manufacture of claim 17, wherein:

the triboelectric sensor comprises a sensor for at least one of a pedometer, a sitting sensor, or a communications interface.

* * * * *